United States Patent [19]

Howard

[11] 4,164,960

[45] Aug. 21, 1979

[54] APPARATUS FOR MIXING FLUIDS

[75] Inventor: Charles W. Howard, San Dimas, Calif.

[73] Assignee: Early California Industries Inc., Phoenix, Ariz.

[21] Appl. No.: 877,335

[22] Filed: Feb. 13, 1978

[51] Int. Cl.[2] .............................................. F16K 19/00

[52] U.S. Cl. ........................................ 137/604; 169/14

[58] Field of Search ...................... 137/13, 604; 169/14

[56] References Cited

U.S. PATENT DOCUMENTS

| | | | |
|---|---|---|---|
| 2,302,799 | 11/1942 | Peterson | 137/604 X |
| 2,340,954 | 2/1944 | Garretson | 137/604 X |
| 3,128,994 | 4/1964 | Hungate | 137/604 X |
| 3,152,117 | 10/1964 | Eijsberg | 137/13 X |
| 3,257,800 | 6/1966 | Lawrence | 137/13 X |
| 3,333,601 | 8/1967 | Lofgreen | 137/604 |
| 3,642,072 | 2/1972 | Livingston | 169/14 X |

*Primary Examiner*—Robert G. Nilson

[57] ABSTRACT

A fluid mixer for mixing a carrier liquid such as water with a thickening agent such as a liquid polymer employs a mixing apparatus in the form of an elbow pipe interconnecting the carrier liquid inlet with a discharge pipe. The polymer thickener is introduced into the fluid stream of the carrier liquid at a point on the outer radius of the elbow where the high velocity stream of carrier liquid impinges upon the side of the elbow pipe to cause the thickener to be impinged upon by the carrier stream at the point of its highest velocity to impart maximum hydraulic shear to the thickener liquid, insuring optimum mixing of the two liquids in the discharge pipe.

1 Claim, 2 Drawing Figures

APPARATUS FOR MIXING FLUIDS

BACKGROUND OF THE INVENTION

A number of applications exist for apparatus and systems for thoroughly mixing or blending two or more fluids together, forming a resultant mixture having unique properties attributable to the mixture. For many applications, the mixing of the fluids presents no particular problems, particularly where the two fluids are liquids of low viscosity. For such liquids the particular manner in which they are mixed is not of much significance, and aspirating systems or systems which merely pour the liquids together in a container with little or no agitation will result in the desired blending.

For liquids of substantially different viscosities, however, or where both liquids are highly viscous, considerable difficulty is encountered in achieving a complete blending or mixing of two different liquids together. Of course, pouring the liquids together in a tank with agitating blades or the like churning through the liquids results, after some length of time, in a thorough blending of such liquids. Many applications, however, do not readily adapt to this type of mixing; and it is desirable to supply the two diffferent liquids in continuously moving high velocity streams to a mixing chamber to produce the resultant blended liquid at the output of the mixing chamber or mixing point. One such application is in the area of fire-fighting where it is desired to introduce a polymer thickener into a flowing water stream to produce a resultant thickened mixture for application to the fire. The mixing for this application must be continuous and at relatively high rates of flow and volume of the liquids used.

In the past, the mixing of a polymer thickener with a high velocity water stream has been achieved by utilizing special nozzles and special constructions of mixing chambers in order to create the desired turbulence in the liquid flow to produce sufficient hydraulic shear in the polymer liquid solution to effect the thorough blending of the polymer solution with the water carrier stream. The use of such nozzles results in head or pressure losses in the fluid stream; and in many cases this is highly undesirable. In addition, the utilization of complex mixing chamber configurations or special nozzles results in additional manufacturing costs and resultant maintenance problems in the mixing equipment.

Another solution in the past has been to introduce the polymer thickener into the water carrier stream in front of a pump, which then draws the thickener and water together through the pump impeller. The impeller blades then serve the dual purpose of pumping and slicing the polymer into the water to minutely subdivide the thickener and uniformly disperse it in the pump discharge. To pass the thickened mixture through the pump creates potential maintenance problems which would not occur if this were not done.

It is desirable to achieve thorough blending of a polymer thickener with a carrier solution such as water in a simple, efficient and inexpensive device.

SUMMARY OF THE INVENTION

Accordingly, it is an object of this invention to provide an improved fluid mixer.

It is another object of this invention to provide an improved fluid mixer to achieve efficient mixing of a thickening fluid with a carrier fluid.

It is an additional object of this invention to utilize hydraulic shear in the mixing of a thickening agent with a carrier fluid in a simple and efficient fluid mixer.

It is a further object of this invention to provide an efficient fluid mixer capable of thorough blending of fluids which are normally not easily mixed or blended.

In accordance with a preferred embodiment of this invention, an apparatus for effecting the mixture of first and second fluids includes a first supply pipe for supplying a stream of the first fluid. A second supply pipe is provided for supplying a stream of a second fluid and an elbow pipe section has one end connected to receive fluid from the first supply pipe and its other end acts as a discharge for the mixture. An aperture is formed on the outer radius of the elbow and is connected with the second supply pipe, so that the second fluid is introduced into the stream of the first fluid in the highest velocity portion thereof to obtain maximum hydraulic shear.

DETAILED DESCRIPTION OF THE PREFERRED EMBODIMENT

Figure 1:
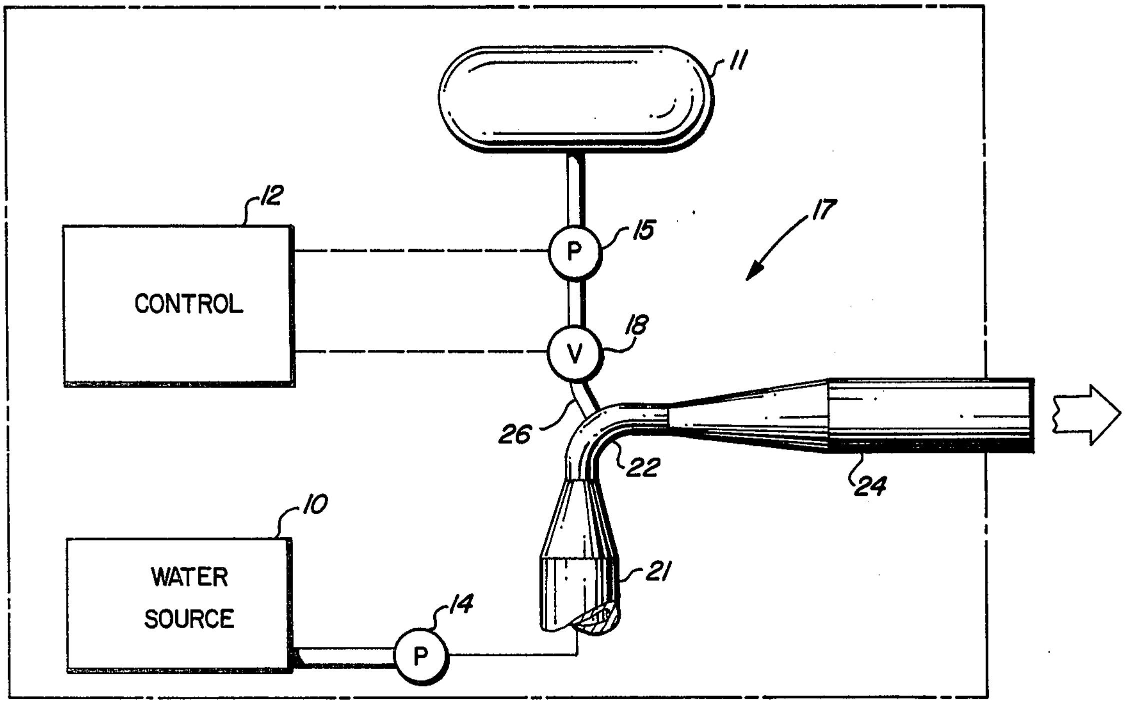
FIG. 1 is a diagrammatic representation of a preferred embodiment of this invention.

Reference now should be made to the drawing in which the same reference numbers are used in both figures to designate the same or similar components. Referring first to FIG. 1, there is shown, in a block diagram schematic representation form, a control system of the type which is employed with a preferred embodiment of the invention. The system is one in which a carrier fluid, typically water, is supplied from a water source 10 and is to be mixed with a thickening agent, typically in the form of a polymer thickener solution from a supply 11. In some applications of the system shown in FIG. 1, the water supply and polymer solution supply both are in tanks carried on a single truck or in one or more tanker trucks which are operated together by a control system 12. This control system operates a pair of pumps 14 and 15 for supplying water from the water source and thickener from the polymer thickener solution source 11 to a mixer apparatus 17. As illustrated in FIG. 1, the control system 12 also is used to operate an electrically controlled valve 18 connected between the pump 15 and the mixer 17.

When the valve 18 is open and both pumps 14 and 15 are operating, the pump 14 supplies water from the water source 10 to a first liquid supply pipe 21 connected to one end of an elbow pipe section 22, the other end of which is connected to an outlet pipe 24. Similarly, the fluid supplied from the polymer thickener solution supply 11 is provided by the pump 15 through the valve 18 and an inlet supply pipe 26 to a point on the outside radius of the elbow 22. The mixture of the carrier fluid from the water source 10 and the thickening agent from the fluid source 11 is discharged by the pipe 24.

Of course the control system and the pumps 14 and 15 may or may not be used in various applications of the system. Obviously, if both of the fluids or liquids from the sources 10 and 11 are available under pressure from some other system, they may be supplied directly to the pipes 21 and 26 without the pumps which have been shown. Alternatively, if the water source 10 is available from a hydrant rather than from a self-contained tank, the pump 14 may be eliminated, while retaining the pump 15 for supplying the thickening agent to the mixer 17. Generally the valve 18 is utilized in a system employed in mixing fluids for extinguishing fires, since there are times in the use of the system that only water is desired, while at other times it is desirable to add the thickening agent to the water supplied by the source 10 to provide a thickened discharge from the pipe 24. The valve 18 and, in most cases, the pump 15 are employed to control the selective application of the polymer thickener agent from the tank 11 as desired. The valve 18 also prevents unwanted intrusion of water into the thickener line.

Figure 2:
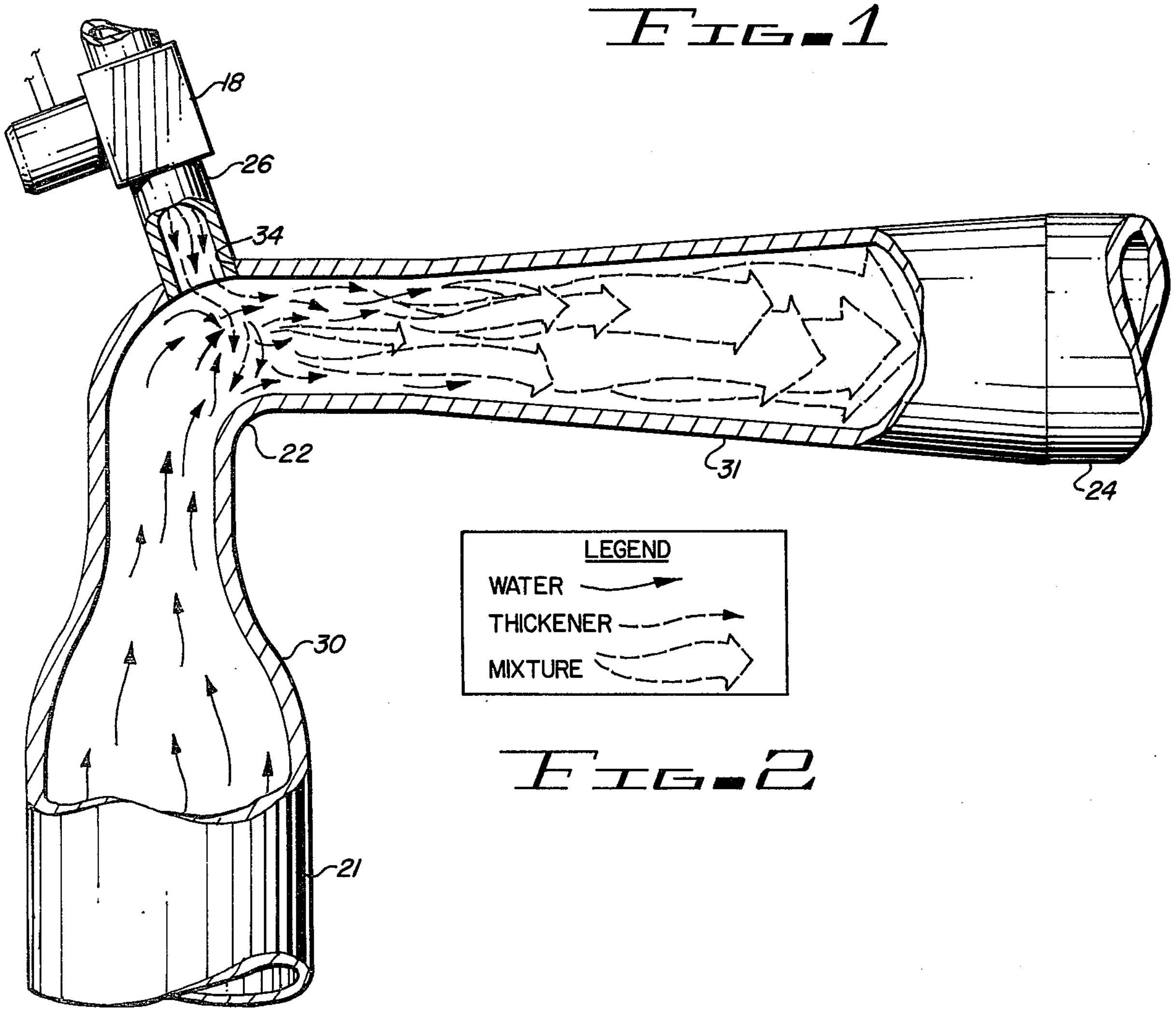
FIG. 2 is a partially cut-away view of a portion of the system shown in FIG. 1.

Referring now to FIG. 2 there is shown a detailed, partially cut-away, drawing of the mixer 17 constructed in accordance with the preferred embodiment of this invention. As is well known, a liquid which is flowing under pressure through a pipe normally has its highest velocity at the center of the liquid stream; and the liquid flow immediately adjacent the internal wall of the pipe is at a slower velocity. The difference in velocities between the center and the outer edge of the liquid stream confined in such a pipe is dependent upon several different factors, among which are the viscosity of the liquid itself and the characteristics of the internal wall of the pipe. As a consequence, if two liquids are mixed together in a mixing "T" where one liquid is introduced at right angles into the pipe through which a first or carrier liquid is flowing, the introduction of the second liquid usually is at the point of lowest liquid velocity in the main or carrier pipe. As a result, a reduced amount of hydraulic shear is available to effect the mixing of the two liquids. If the second liquid which is introduced into the "T" is of a relatively high viscosity, insufficient hydraulic shear may exist to insure adequate and thorough mixing or blending of the two liquids downstream from the mixing point.

When a liquid is flowing through a pipe and makes a turn, such as caused by a 90° elbow, the direction of flow obviously is changed as determined by the elbow or turn in the pipe. When this occurs, the center of the liquid stream impinges upon the elbow on the side of its outer radius; so that the point of greatest velocity or flow of the liquid at this place in the pipe, that is at the bend of the elbow, no longer is in the center of the stream, but is directly at the outer radius edge of the elbow in the pipe. Once the turn is made and the turbulence has dissipated, the original condition of the highest fluid flow in the center of the pipe resumes on the discharge side of the pipe.

The apparatus in FIG. 2 is designed to produce a mixer which takes advantage of the above observation. The supply pipe 21, through which water from the water source 10 (FIG. 1) is provided, is necked down by a reducing pipe section 30 to increase the velocity of the liquid flowing through the section 30 and into the elbow 22 just as that liquid enters the elbow 22. The increased velocity liquid then strikes the inside of the outer radius of the elbow 22, as described above, and is diverted toward the right as shown in FIG. 2 to the discharger outlet side of the elbow. A reverse connected reducing pipe section 31 gradually expands the fluid stream downstream of the elbow 22 back to the original internal diameter of the supply pipe 21. The discharge end of the section 31 is connected to the discharge pipe 24. By the use of the section 31 to increase the diameter of the fluid stream back to the size it had in the pipe 21, the head pressure losses which are produced by the restricted diameter section of the elbow 22 are recovered; so that the downstream pressure in the discharge pipe 24 is nearly the same as that which was supplied originally through the pipe 21.

To produce an effective and thorough blending or mixing of the polymer thickening agent flowing through the valve 18 and the pipe 26 to the outer radius of the elbow 22, the pipe 26 is connected into the elbow 22 through an aperture 34 on the outer radius at or just slightly downstream of the point where the high velocity portion of the fluid flow coming upward through the pipe 21 (as viewed in FIG. 2) strikes the inside of the outer radius of the elbow 22. This causes the highest velocity carrier liquid to be guided around the inside of the outer radius of the pipe 22 at the aperture 34 into which the polymer thickener fluid is supplied. A substantial amount of hydraulic shear occurs at this point and produces significant turbulence in the fluid stream immediately downstream of the bend in the elbow 22 resulting in a thorough mixing of the polymer thickener with the water carrier. The term "outer radius" is intended to include that portion of the elbow 22 or the pipe immediately passed the bend in the elbow 22 where the maximum velocity portion of the carrier liquid is against the upper side (as viewed in FIG. 2) of the elbow and the portion of the downstream pipe immediately adjacent the discharge end of the elbow 22.

In FIG. 2, the water carrier is indicated by the solid line arrows flowing upward through the pipe 21 and the reducing section 30, the polymer thickening fluid is represented by the single dotted line arrows flowing downwardly through the pipe 26, and the resultant thickened mixture is indicated by the wide dotted line arrows illustrated within the reverse connected reducing pipe section 31 which is used to recover the head pressure of the resultant fluid stream.

In FIG. 2 the diameter of the elbow 22 is illustrated and has been described as a reduced diameter compared to the diameters of the pipes 21 and 24. This configuration should be used to increase the fluid velocity for applications where the velocity which is present in the pipe 21 is not sufficiently high to insure the amount of hydraulic shear necessary to provide complete blending or mixing of the two fluids. In applications, however, where the velocity of the liquid or other fluid in the pipe 21 is already very high, the reducing sections 30 and 31 are not necessary and the elbow 22 can have the same internal diameter as the pipes 21 and 24. For applications where the liquid velocities in the pipe 21, however, are relatively low and where head losses should be minimized, the arrangement which is illustrated in FIG. 2 has been found to be an ideal solution to the problem of providing a high hydraulic shear for the purpose of insuring thorough mixing of the two fluids.

No special nozzles are required in the construction shown in FIG. 2, and no complex plumbing connections are necessary; but by simply utilizing the elbow 22 and introducing the second liquid into the elbow at its outer radius where the highest velocity flow in the carrier fluid stream occurs, mixing results previously attainable only with special nozzles and complex plumbing arrangements are attained. Because the opening 34 can be relatively large as compared to nozzles used in the prior art, the problem of clogging of the opening 34 is much reduced over prior art nozzle apparatus when a thickener fluid of high viscosity is used in the system.

The foregoing description of the preferred embodiment in conjunction with FIGS. 1 and 2 is illustrative only and is not to be considered as limiting of the true scope of the invention which covers various modifications and changes that will readily occur to those skilled in the art.

I claim:

1. A mixing system for intermittently mixing water with a relatively much more viscous liquid polymer thickening agent, to form a fire extinguishing and retarding composition of variable viscosity, said system including:

(a) a reservoir for said polymer liquid;

(b) a mixing conduit including an elbow section having an aperture formed in the wall of the outer radius thereof;

(c) means for delivering water under pressure to said mixing conduit upstream of said elbow section;

(d) means for injecting said polymer liquid under pressure through the aperture in said elbow section, such that said liquid exits said aperture at the inner surface of the outer radius of said elbow section and in a direction substantially perpendicular to said inner wall, to mix said polymer with said water under high hydraulic shear conditions; and (e) valve means intermediate said polymer reservoir and said aperture for controllably interrupting the injection of liquid polymer through said aperture and for preventing flow of water into said polymer reservoir when said polymer injection is interrupted.

* * * * *